United States Patent
Schroeder genannt Berghegger

(10) Patent No.: US 8,164,926 B2
(45) Date of Patent: Apr. 24, 2012

(54) CONTROL CIRCUIT FOR A SWITCHED-MODE POWER SUPPLY WITH REGULATION BASED ON THE SECONDARY-SIDE CURRENT FLOW TIME PERIOD

(75) Inventor: Ralf Schroeder genannt Berghegger, Glandorf (DE)

(73) Assignee: Flextronics AP, LLC, Broomfield, CO (US)

( * ) Notice: Subject to any disclaimer, the term of this patent is extended or adjusted under 35 U.S.C. 154(b) by 456 days.

(21) Appl. No.: 12/422,662

(22) Filed: Apr. 13, 2009

(65) Prior Publication Data

US 2010/0046253 A1  Feb. 25, 2010

(30) Foreign Application Priority Data

Apr. 14, 2008 (EP) .................................. 08007335

(51) Int. Cl.
*H02M 3/335* (2006.01)
(52) U.S. Cl. ........................ 363/21.12; 363/97
(58) Field of Classification Search ............. 363/16–20, 363/21.04, 21.07, 21.12, 40, 41, 55, 56.01, 363/95, 97, 131; 307/39, 40, 66, 85
See application file for complete search history.

(56) References Cited

U.S. PATENT DOCUMENTS

| | | | | |
|---|---|---|---|---|
| 5,377,091 A | * | 12/1994 | Faulk | ......................... 363/21.16 |
| 5,936,852 A | | 8/1999 | Weinmeier et al. | |
| 6,084,784 A | * | 7/2000 | Durbaum | ................... 363/21.12 |
| 6,469,914 B1 | | 10/2002 | Hwang et al. | |
| 6,518,733 B1 | | 2/2003 | Schenkel et al. | |
| 6,836,415 B1 | | 12/2004 | Yang et al. | |
| 7,307,390 B2 | * | 12/2007 | Huynh et al. | .................. 315/291 |
| 7,339,799 B2 | * | 3/2008 | Osaka et al. | ..................... 363/17 |
| 7,359,220 B2 | | 4/2008 | Berghegger | |
| 7,672,146 B2 | | 3/2010 | Park et al. | |
| 7,684,215 B2 | | 3/2010 | Park et al. | |
| 7,701,735 B2 | | 4/2010 | Park et al. | |
| 7,738,266 B2 | * | 6/2010 | Jacques et al. | ............. 363/21.02 |
| 7,894,223 B2 | * | 2/2011 | Sato et al. | ........................ 363/97 |
| 8,045,344 B2 | * | 10/2011 | Grant | .............................. 363/28 |
| 2005/0219870 A1 | | 10/2005 | Yang et al. | |
| 2007/0103943 A1 | | 5/2007 | Mangtani et al. | |

FOREIGN PATENT DOCUMENTS

WO  9930409  6/1999

* cited by examiner

*Primary Examiner* — Rajnikant Patel
(74) *Attorney, Agent, or Firm* — Marsh Fischmann & Breyfogle LLP

(57) ABSTRACT

A control circuit for a primary controlled switched-mode power supply that has a primary-side switch and a transmitter. It also relates to an associated switched-mode power supply. The control circuit can be connected to a control input of the primary-side switch so that the primary-side switch is controlled based on a secondary-side current flow time period in which a current flows through the secondary-side winding of the transmitter in order to regulate the output voltage. The secondary-side current flow time period can be used as a control parameter instead of the actual output voltage in order to then control the primary-side switch. Because the secondary-side current flow time period can be determined indirectly on the primary side, no direct feedback is necessary between the output voltage on the secondary side and the control circuit on the primary side.

20 Claims, 2 Drawing Sheets

CONTROL CIRCUIT FOR A SWITCHED-MODE POWER SUPPLY WITH REGULATION BASED ON THE SECONDARY-SIDE CURRENT FLOW TIME PERIOD

BACKGROUND

Known switched-mode power supplies typically use a power transistor switch, in order to feed a pulsed current flow to a network of inductive-energy and capacitive-energy storage elements that convert the switched current pulse into regulated DC voltage. According to the operating mode of the switched-mode power supply, switched-mode power supplies can supply output voltages that are larger, smaller, equal to, or of opposite polarity than the unregulated input voltage. Switched-mode power supplies are often used in AC line-powered power supply circuits. Here, such switched-mode power supplies should accept input voltages in the range of 85 V to 270 V AC and in this way should be able to operate with different AC power line distribution systems anywhere in the world without modification or switches. In addition, the output voltage must be regulated sufficiently and precisely, in order to avoid, on the one hand, damage to the load and, on the other hand, unnecessary power consumption. Finally, modern switched-mode power supplies must be extremely economical and must have physical dimensions that are minimized as much as possible.

The output voltage of known primary switched switched-mode power supplies is typically regulated by means of a feedback signal that indicates the output voltage and/or the output current. In order to be able to use the output voltage as a control parameter, the feedback of a corresponding signal must be realized from the secondary side to the control loop on the primary side. This feedback signal is used to control the operating cycle of the switching power transistor. In order to prepare a suitable feedback signal, there are mutually different approaches. For example, a primary-side auxiliary coil could be provided that generates, during the switch-off time of the primary-side switch, a feedback signal that delivers an indication of the output voltage. Alternatively, but also directly, the output voltage could be fed back via an optocoupler. Alternatively, other signal transmitters could also be used, in order to signal the output voltage on the secondary side directly to the control circuit on the primary side.

These feedback variants have the disadvantage that they must use an auxiliary coil, an optocoupler, or a signal transmitter. For example, in the case of an auxiliary coil in the transformer, this is comparatively complex and expensive.

SUMMARY

Disclosed is a simple and economical control circuit for a switched-mode power supply that allows it to regulate the output voltage of a switched-mode power supply without having direct feedback between the secondary and primary sides.

This problem is solved by the subject matter of the independent Claim 1. Advantageous refinements of the present invention are the subject matter of the dependent claims.

The secondary-side current flow time period can be used as a control parameter instead of the actual output voltage, in order to then control the primary-side switch. Because the secondary-side current flow time period can be determined indirectly on the primary side, no direct feedback is necessary between the output voltage on the secondary side and the control circuit on the primary side.

Thus, according to the design of the control circuit, the switch-off time and/or the switch-on time of the primary-side switch can be determined based on the secondary-side current flow time period.

The secondary-side current flow time period can be determined on the primary side, wherein the beginning of this current flow time period on the secondary side is defined by the switch-off time of the primary-side switch, because the current through the secondary-side winding begins to flow only at this time.

The end of the current flow time period in which a current flows through the secondary side can be determined because the voltage on the primary winding is monitored. The primary and secondary windings in a transformer are magnetically coupled, and if ideal components are assumed, the voltages on the two windings have an identical profile. When the secondary-side current no longer flows, there is also no longer a voltage on the secondary winding nor thus also on the primary winding. Consequently, the end of the secondary-side current flow time can be determined with reference to the zero crossing of the voltage on the primary coil.

The voltage on the primary coil is relatively high, which is why this voltage is not measured directly on the primary coil, but instead at the control input of the switch on which this voltage is also applied. The high voltage of the primary winding lies on the collector input of the bipolar transistor (can be used, for example, as a switch). Due to the high voltage, by means of the parasitic capacitance between the collector input and the base input (control input) of the bipolar transistor, a sufficiently high voltage can be tapped at the base input, in order to determine whether the voltage on the primary coil has decayed, i.e., a zero crossing of the voltage has occurred.

Alternatively, parasitic capacitors could also be used between printed conductors, in order to tap the voltage on the primary winding.

According to one advantageous embodiment, the primary-side switch is held at high impedance in the switched-off state, so that the voltage on the primary winding is better transferred to the voltage at the base input of the bipolar transistor.

The control output of the control circuit that is used for controlling the primary-side switch can be connected to the control input of the switch. On the control input of the switch, the aforementioned voltage is also tapped and is thus fed back via the control output to the control circuit. Thus, the control output of the control circuit must be able to work in both directions. However, an additional terminal on the control circuit could also be provided, in order to feed back the voltage on the base input of the bipolar transistor that corresponds to the voltage on the primary winding. Alternatively, this terminal could be connected resistively or capacitively to a winding of the transformer.

As already mentioned, the secondary-side current flow time period can be used as a control parameter to regulate the output voltage of the switched-mode power supply. The limiting value for the current flow time period that is required for the actual control loop is defined by one or more switching elements that are connected to a feedback input of the control circuit.

The output voltage of the switched-mode power supply is dependent on several factors, such as, among others, the peak value of the current in the secondary winding, the inductance of the secondary winding of the transformer, and the secondary-side current flow time period. The associated formula reads:

$$t\_sek = L\_sek * I\_sek\_\max/(V\_\text{out} + V\_d)$$

with $$I\_sek\_max = I\_prim\_max * Np/Ns$$

Because L_sek, Np, Ns, and V_d are constant, the secondary-side current flow time period t_sek is dependent only on I_prim-max and V_out. In order to allow a simple, direct correspondence between t_sek and V_out, the maximum current I_prim_max flowing through the primary winding can be kept equal for each switching off of the primary-side switch.

BRIEF DESCRIPTION OF THE FIGURES

The invention will be explained in greater detail below with reference to implementations shown in the accompanying FIGS. 1 and 2.

DETAILED DESCRIPTION

Figure 1:
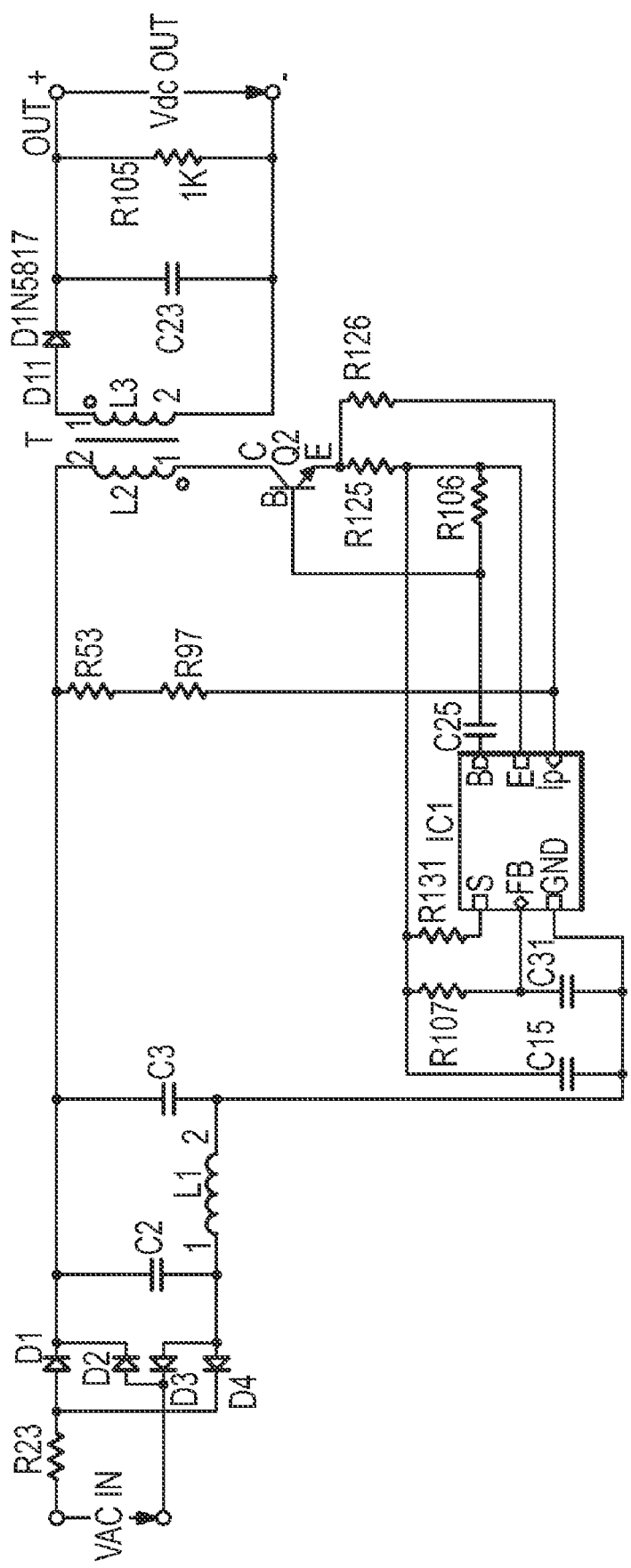
FIG. 1 shows a circuit diagram of a primary-controlled switched-mode power supply with a control circuit according to an embodiment of the present invention.

The switched-mode power supply is described below with reference to FIG. 1.

The alternating voltage (Vac in) is applied to the input of the switched-mode power supply. In Europe, the power line voltage varies between 180 V and 263 V AC and in the US between 90 V and 130 V. With the aid of the bridge rectifier made from the diodes D1-D4 and also the capacitors C2, C3, and the inductor L1, the input voltage of $V_{ac}$ in is rectified and stabilized and it is ensured that noise signals generated in the switched-mode power supply do not reach too strongly the AC power line.

The primary-side winding L2 of the transmitter T formed as a transformer and the primary-side switch Q2 are connected to each other in series. The rectified input voltage is applied to the terminal 2 of the primary-side winding L2. The primary-side switch Q2 interrupts the current flowing through the primary-side winding L2 according to the control signal B of the control circuit IC1.

For example, the switch-off period of the primary-side switch Q2 can be set so that the energy fed to the transformer T is dependent on the output voltage $V_{dc}$ out. Thus, the transferring power is set so that a desired value for the output voltage $V_{dc}$ out is produced, as will be explained in greater detail below.

One of the central elements of the switched-mode power supply is the transmitter, usually designed as a transformer with a primary-side and a secondary-side winding. Flyback converters that are applied as examples are among the most used type of switched-mode power supplies. However, someone skilled in the art could easily apply the following principles to a few other types of switched-mode power supplies. For flyback converters, the energy is always transmitted to the output only during the non-conducting phase of the switching transistor. In detail, during the flow phase (the switch Q2 is closed), the input voltage is applied to the primary-side winding L1 and a linearly increasing current flows through the primary coil L1. Here, the energy of the input voltage source is transmitted to the primary coil, especially to the air gap of the transformer, since a magnetic field is established by the current flow. The stored energy in the primary-side main winding depends on the current intensity through the winding at the switch-off time. The higher the current, the greater the stored energy that is then transmitted to the secondary side.

During the flow phase, no energy is transmitted to the secondary side, since, due to the polarity of the secondary winding, the diode on the secondary side is non-conducting and thus no current can flow through the secondary side. During the flow phase, the load must be supplied with current from a secondary-side capacitor connected in parallel with the secondary winding.

When the switch Q2 is now opened, the non-conducting phase begins, during which the actual energy exchange takes place. Through the opening of the primary-side switch, the polarity on the secondary winding changes, since according to the law of induction, the voltages on the transformers are reversed. The diode on the secondary side is now conductive and on the secondary side a constantly decreasing current begins to flow. Thus, the energy stored in the transformer is output to the output load and to the output capacitor.

The control circuit that is constructed here as an application-specific integrated circuit (ASIC) controls the driver output B and thus the switch-on and switch-off times of the primary-side switch Q2. Both the control of the frequency and also the pulse width are defined by the switch controller. Here, the switch-on time determines the period of the non-blocking phase and thus the frequency of the energy transmission. The switch-off time determines the current flow period and thus the pulse width that corresponds to the energy to be transferred. In other words, the switch-off period and thus the clock frequency can be regulated by the switch-on time. Through the switch-off time, the energy pulse width can be set and thus also the energy to be transferred to the primary-side main winding.

According to the invention, the switched-mode power supply has no feedback to the output voltage, i.e., there is no direct connection between the secondary side and the primary side, in order to feed back a signal corresponding to the output voltage. Instead, the current flow period on the secondary side is used as a control parameter after the opening of the switch Q2. Because this control parameter on the primary side can be determined, no direct feedback from the secondary side is required. This has several advantages, such as, for example, lower production costs, because the transformer does not have an auxiliary winding or the switched-mode power supply does not have to use an optocoupler. The galvanic separation between the primary and secondary side is given by the transformer, and because no feedback is required, the input and output side are completely isolated from each other.

It is explained below why the secondary-side current flow time period can be used in order to regulate the output voltage of the switched-mode power supply.

For a switched-mode power supply according to the flyback converter principle in discontinuous operation, the current flow period after the switching off of the primary-side switch is calculated approximately as follows:

$$t\_sek = L\_sek * I\_sek\_max / (V\_out + V\_d)$$

with $$I\_sek\_max = I\_prim\_max * Np/Ns$$

where
t_sek=current flow period on the secondary side after switching off of the switch Q2
L_sek=inductance of the secondary winding of the transformer
I_sek_max=peak value of the current in the secondary winding
V_out=output voltage
V_d=flow voltage of the rectifier diode on the secondary side Iprim max=peak value of the current in the primary winding
Np=number of turns of the primary coil
Ns=number of turns of the secondary coil Because L_sek, Np, Ns, and V_d are constant or approximately constant, t_sek is dependent only on I_prim_max and V_out. I_prim_max can be measured and controlled on the primary side. Thus, by determining the secondary-side current flow time after the switching off of the switch, the level of the output voltage can be determined indirectly. This is simplest when advantageously the same maximum primary current I_prim_max is impressed for each pulse. In this case, each time period t_sek corresponds to exactly one output voltage. Consequently, it is possible to regulate the output voltage because t_sek is regulated.

For the regulation with reference to t_sek, a limiting value is still required for the secondary-side current flow time period with whose aid a closed control loop could be formed.

For this purpose, as an embodiment, an RC element made from the resistor R107 and the capacitor C31 is connected to the feedback input FB of the control circuit IC1. The capacitor C31 is discharged into the IC1 during the flow phase via the pin FB. When the primary-side switch Q2 is opened, the capacitor C31 is loaded via the resistor R107 by the supply voltage applied to the resistor R107 and thus provides a time value for the control circuit. The voltage on the pin FB of IC1 is compared with a reference voltage formed in IC1. The time value is reached when the voltage on FB is equal to this reference voltage.

According to the formula disclosed above, a high output voltage V_out corresponds to a low t_sek value and a low output voltage corresponds to a long current flow time period.

If the determined secondary-side current flow time period t_sek falls below the limiting value defined above (see C31 and R107), then the input voltage is too high and less energy must thereby be transmitted with the next pulses from the primary side to the secondary side.

To achieve this, for example, for a flyback converter, the switch-on time of the primary-side switch can be delayed, wherein the clock frequency of the energy transmission is decreased (here, the energy per pulse advantageously remains the same, wherein the transmitted energy per unit time can be changed only with reference to the clock rate). Through the subsequent closing of the switch Q2, less energy is transmitted and the output voltage falls. Alternatively, the switch-off threshold for the primary current could also be reduced, so that less energy is transmitted per pulse. Then, however, the time reference also must be adapted, e.g., through adaptation of the reference voltage.

If the secondary-side current flow time period is greater than the limiting value, then the output voltage is too low and more energy must be transmitted to the secondary side. The clock rate of the energy transmission must be increased and thus the primary-side switch is closed again at an earlier time.

As explained above, this produces a closed control loop that can regulate the output voltage (and/or the output current) to a desired value.

It shall be explained below how the current flow period during which a current flows through the secondary side can be determined.

The beginning of the secondary-side current flow time period t_sek corresponds to the switch-off time of the primary-side switch, because the diode D11 on the secondary side is conductive only when the switch Q2 is switched off and thus a current flow is possible on the secondary side.

As already mentioned, the end of the current flow time period is determined with reference to the voltage on the primary winding. More specifically, when the primary winding voltage falls to zero, the secondary voltage is also at zero due to the magnetic coupling and thus current no longer flows through the secondary winding on the secondary side.

According to an advantageous embodiment, this primary winding voltage is determined by measuring the voltage on the base input of the primary-side switch Q2. For this purpose, the parasitic capacitance of the switch is used. Because the voltage on the primary winding of the transformer is usually very high, sufficient energy can also be transmitted via small capacitors to detect the voltage profile. Thus, for example, it is possible to use for this purpose the base voltage, if a bipolar transistor is used as the switch, or to use the gate voltage if an FET is used. Then the profile of the voltage on the transformer can be detected at the base or the gate, because the voltage is coupled via the collector-base or drain-gate capacitance (Miller capacitance) to the base or the gate, respectively.

To improve this coupling between the collector voltage and the resulting base voltage, the switch can be kept at relatively high impedance in the switched-off state. The switch-off process must be performed quickly, so that the switch is initially controlled with low impedance. After the switch-off process is completed, however, it is sufficient to control with high impedance from the switch, in order to keep the switch in the open state. Through the high impedance control, the voltage transmitted by the parasitic capacitance to the base of the switch increases, wherein this voltage can thus be better measured.

Instead of determining the primary winding voltage via the voltage on the base input of the switch, parasitic capacitance between printed conductors can also be used in this way. For example, a track conductor that is capacitively coupled to the printed conductor between pin C of Q2 and pin 1 of L2 (e.g., parallel printed conductor routing) can be connected to an input pin of the control circuit. Thus, an image of the voltage on pin 1 of L2 is produced at the input pin. Here, because the control signal of pin B is not superimposed, in this embodiment the current flow time period is easy to determine.

In the manner described above, it is possible to measure the secondary-side current flow time period on the primary side and thus to regulate the output voltage of the switched-mode power supply, without requiring an auxiliary winding on the transformer or an optocoupler (or the like).

The supply voltage terminal E of the control circuit IC1 is connected via the resistor R125 to the emitter of the primary-side switch, so that the supply voltage can be obtained directly from the primary-side current flowing through the switch Q2.

To be able to dissipate excess current, a branch resistor R131 is connected in parallel for this purpose and is connected via the switching terminal S to a switch arranged in the IC1 so that the excess current could be dissipated parallel to the operating voltage. Internally, in the ASIC IC1 there are comparison means that monitor whether the operating voltage lies outside a defined value, e.g., 3 V or 5 V. If the operating voltage exceeds this threshold value, then the internal switch is switched on and the excess current is dissipated through the resistor R131 and via ground parallel to the operating voltage of the IC. In this way, most of the power dissipation is not generated in the ASIC IC1, but instead in the branch resistor R131, so that the temperature increase that could possibly be critical is produced outside of the ASIC. In this way it could be achieved that, with an economical component, namely a resistor, the operating voltage of the control circuit could be limited.

As the primary-side switch Q2, in the present embodiment, a power bipolar transistor is provided. Obviously, any common semiconductor power switch could be used, that is, a bipolar transistor, field-effect transistor, or insulated gate bipolar transistor (IGBT).

Because the highest potential of the control circuit is less than the potential required for switching on the transistor Q2, between the control terminal of switch Q2 and the driver output B of the ASIC there is a capacitor C25. One terminal of this capacitor is connected to the resistor R108 to the operating voltage potential of the control circuit, that is, to the terminal E of the ASIC IC1, so that, when the driver output B of the control circuit is switched, voltages above the operating voltage could be achieved. Thus, the power switch Q2 could be safely switched on and switched off, even though the actual operating voltage would lie below the required values.

In order to be able to limit the maximum current in the transformer T, between the control circuit and the output of the power circuit Q2, that is, the emitter terminal E or, in the case of an FET, the source terminal, a resistor R125 is connected. The voltage drop on this resistor is led via another resistor R126 to the peak current detection terminal Ip of the control circuit. With reference to the voltage drop on the peak current detection terminal Ip, through the control circuit IC1, the time is determined at which the power switch Q2 must be switched off.

The sixth terminal of the ASIC is a ground terminal GND and is connected to ground.

For start-up, the control circuit IC1 requires a small current. In the switched-mode power supply shown here, this is performed by means of two starter resistors R53 and R97 that are connected to the rectified input voltage of the switched-mode power supply. The second terminal of the starter resistor R97 is not connected directly to the operating voltage input E of the control circuit, but instead to its terminal Ip for limiting the maximum current. Through suitable dimensioning of the resistors on this terminal, namely the starter resistors R53 and R97 and the resistor R126, a variation of the switch-off current produced by the switch-off delay of the power switch Q2 in a variation of the input voltage could be compensated.

Figure 2:
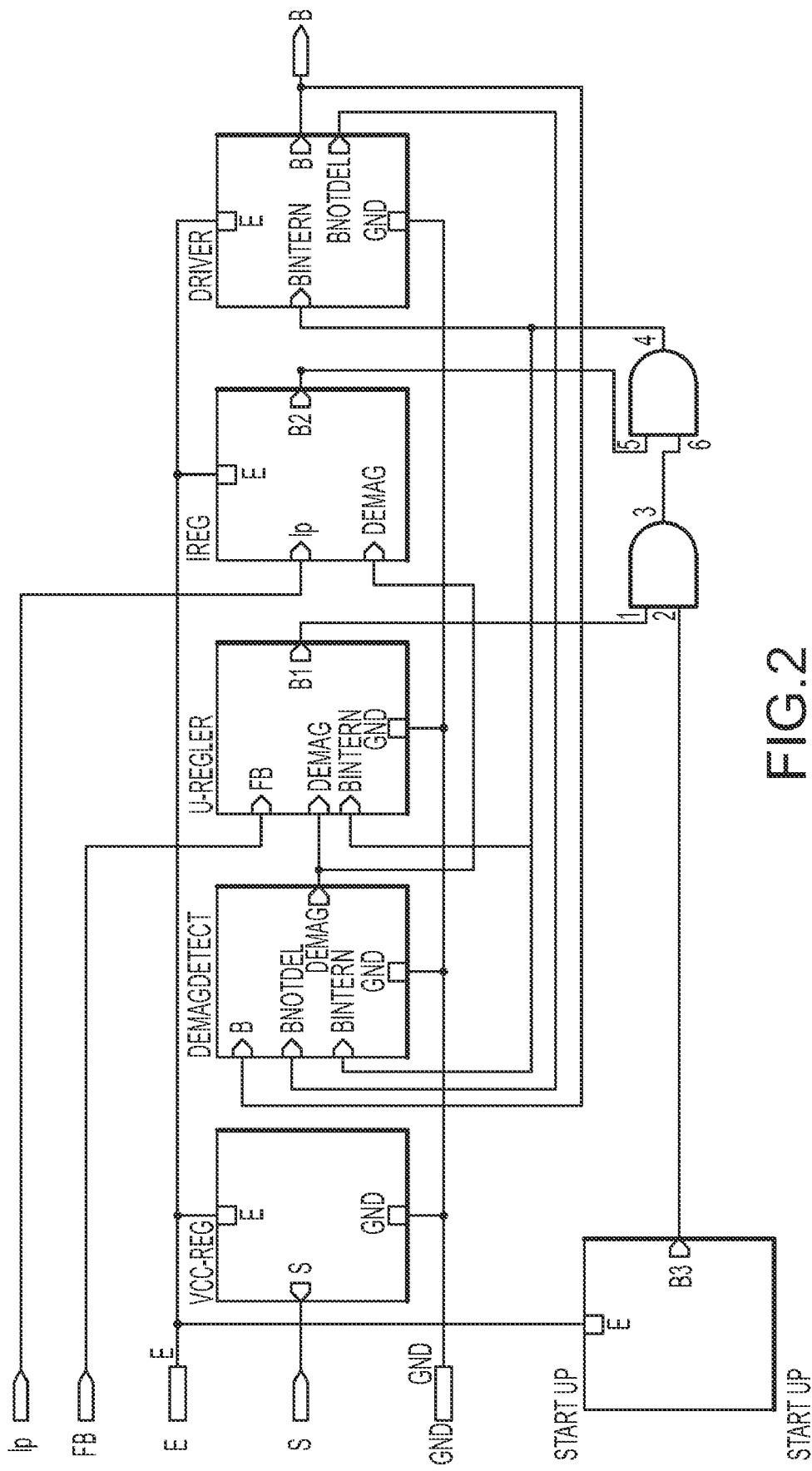
FIG. 2 shows a functional setup of a control circuit in a primary-controlled switched-mode power supply according to an embodiment of the present invention.

FIG. 2 shows the internal functional construction of the control circuit IC 1 according to an example embodiment. The control circuits divided into six sub-groups whose functions shall be explained in greater detail below.

The $V_{cc}$ regulator ($V_{cc}$-Reg) is connected to the pins S, E, and GND (ground) and has the task of keeping the voltage on pin E constant. As already described, if the operating voltage is too high, excess current is dissipated via the resistor R131 and the pin S. For this purpose, the current flowing in via the pin S is forwarded within the Vcc regulator to ground until the operating voltage has dropped again to the correct value (e.g., 5V).

The demagnetization detector (DemagDetect) must determine when the primary winding is demagnetized, i.e., when voltage is no longer applied to the primary winding. For this purpose, the detector is connected to the pins B, BNotDel, and Bintern and outputs a corresponding output signal on the pin Demag. On pin B, the demagnetization detector can determine the voltage profile at the control input of the switch Q2. This takes place only while the switch Q2 is in the open state, which the detector recognizes with reference to a corresponding signal on the pin Bintern. The pin BNotDel delays the measurement of the voltage on the pin B until the switch-off process of the primary-side switch is completely finished. When a zero crossing of the voltage on pin B is detected (that is, the voltage on the base of the transistor Q2), the demagnetization detector outputs a corresponding signal via the pin Demag.

The voltage regulator (U-Regler) has three inputs FB, Demag, and Bintern, in order to thus prepare an output signal B1 with whose aid the driver (will be described below) controls the primary-side switch. Within the voltage regulator, the secondary-side current flow time period is determined and compared with a limiting value. By means of the pin Bintern, the voltage regulator can determine when the current begins to flow on the secondary side namely, when the primary-side switch Q2 is switched off. The end of the current flow time period is defined by means of the pin Demag and its signal that is generated by the demagnetization detector. The time period determined in this way is compared with a limiting value that is set with the aid of the signal on the pin FB. According to whether the secondary-side current flow time period falls below this limiting value or not, a signal is applied to the output B1 of the voltage regulator. In principle, the output regulator regulates the switch-on time of the switch Q2.

The current regulator (IReg) is principally there to determine the switch-off time of the primary-side switch. For this purpose, the inputs Ip and Demag are used. As already described, the voltage drop across resistor R125 is led via another resistor R126 to the peak current detection terminal Ip of the control circuit. With reference to the voltage drop at the peak current detection terminal Ip, the current regulator can determine the time at which the power switch Q2 must be switched off. Advantageously, the switch-off time could be selected so that, for each pulse, the same maximum current is impressed. With the aid of the Demag signal, the current flow period in the secondary winding could be determined. Thus, the earliest time at which Q2 may be switched on is set. In a known way, the output current could be limited. In the simplest embodiment, Q2 is then switched on again at the earliest when the current flow in the secondary winding is ends. This leads to the so-called quasi-resonant mode as long as the output voltage is less than the control voltage. Therefore, the output current increases with decreasing output voltage. Alternatively, the setting of a constant duty factor of the current in the secondary winding is also possible, which results in output voltage-independent current limiting.

The driver is responsible for generating a corresponding control signal B for the primary-side switch from the input signal Bintern that is produced from a combination of the outputs B1, B2, and B3. The driver is also responsible for controlling the switch with high impedance, in order to keep it in the switched-off state. The signal BNotDel is output by the driver, in order to signal to the demagnetization detector when the switch-off process of the switch has been completed, so that it can begin with the detection of the demagnetization of the primary winding.

The startup components of the control circuit will be used only when switching on the switched-mode power supply.

Indeed, until now it was assumed that the control circuit is used for regulating the output voltage of the switched-mode power supply. However, the use of the principle is not limited to this case. For example, the determination of the output voltage by means of the secondary-side current flow time period could also be used for overvoltage protection (OVP).

For a switched-mode power supply it must be ensured that, in the case of a defective connection of the auxiliary winding or a wire break, the output voltage of the switched-mode power supply is limited to a safe level through suitable measures. Typically, this occurs by means of another control loop. A disadvantage in this known method is that additional components are usually required that make the circuit unnecessarily complex and expensive.

The switched-mode power supply according to another embodiment features typical regulation of the output voltage with the aid of feedback by an auxiliary winding or an optocoupler. In other words, the regulation is performed not as described above based on the secondary-side current flow time period, but instead based on a feedback signal that corresponds to the output voltage and is fed back, for example, via an auxiliary winding on the transmitter to the primary side. The control circuit also has, in addition to the functions required for the actual output voltage regulation, an overvoltage protection function. The output voltage is monitored with the aid of the secondary-side current flow time period that cold be determined as described above. A limiting value is again defined below which the current flow time period should not fall, wherein the limiting value corresponds to an output voltage that should not be exceeded by the switched-mode power supply. Now, in order to realize the overvoltage protection, the primary-side switch could be switched off for some time period or permanently, when the determined secondary-side current flow time period falls below the limiting value. Then energy is no longer transmitted to the secondary side and the output voltage drops.

If there is feedback in the switched-mode power supply (e.g., if OVP is realized), then the end of the secondary-side current flow time period could also be determined with the aid of the feedback signal instead of using the voltage on the primary winding. For example, known methods of demagnetization detection could be used on the auxiliary winding.

The control circuit allows a switched-mode power supply to be specified in which costs can be spared in contrast to the known method in which an auxiliary winding or an optocoupler is used, in order to feed back the output voltage from the secondary side to the primary side.

The invention claimed is:

1. A control circuit for a primary controlled switched-mode power supply having an output voltage and a transformer that has a primary-side winding and a secondary-side winding, comprising:
a primary-side switch that switches current through the primary-side winding;
wherein the control circuit can be connected to a control input of the primary-side switch so that the primary-side switch is controlled based on a secondary-side current flow time period in which a current flows through the secondary-side winding of the transformer, in order to regulate the output voltage of the switched-mode power supply.

2. A control circuit according to claim 1, wherein the secondary-side current flow time period as a control parameter is compared with a reference time, in order to regulate the output voltage.

3. A control circuit according to claim 2, wherein the switch-on time of the primary-side switch is defined based on the secondary-side current flow time period.

4. A control circuit according to claim 1, wherein the switch-on time of the primary-side switch is defined based on the secondary-side current flow time period.

5. A control circuit according to claim 4, wherein the secondary-side current flow time period begins with the switch-off time of the primary-side switch.

6. A control circuit according to claim 1, wherein the secondary-side current flow time period begins with the switch-off time of the primary-side switch.

7. A control circuit according to claim 6, wherein the end of the secondary-side current flow time period is defined by the zero crossing of the voltage on the primary-side winding.

8. A control circuit according to claim 1, wherein the end of the secondary-side current flow time period is defined by the zero crossing of the voltage on the primary-side winding.

9. A control circuit according to claim 8, wherein the voltage on the primary-side winding is determined by measuring the voltage on the control input of the primary-side switch.

10. A control circuit according to claim 9, wherein the voltage on the control input of the primary-side switch is fed back to the control circuit via a control output of the control circuit.

11. A control circuit according to claim 10, wherein at least one switching element can be connected to a feedback input of the control circuit, in order to define a limiting value for the current flow time period.

12. A control circuit according to claim 1, wherein at least one switching element can be connected to a feedback input of the control circuit, in order to define a limiting value for the current flow time period.

13. A control circuit according to claim 12, wherein the control circuit keeps the primary-side switch with high impedance in the switched-off state.

14. A control circuit according to claim 1, wherein the control circuit keeps the primary-side switch with high impedance in the switched-off state.

15. A control circuit according to claim 14, wherein the primary-side switch is switched off so that the maximum current flowing through the primary-side winding is equal for each switching off of the primary-side switch.

16. A control circuit according to claim 1, wherein the primary-side switch is switched off so that the maximum current flowing through the primary-side winding is equal for each switching off of the primary-side switch.

17. A switched-mode power supply with a control circuit according to claim 1.

18. A switched-mode power supply according to claim 17, wherein the control circuit is implemented as overvoltage protection for the switched-mode power supply.

19. A switched-mode power supply according to claim 18, wherein the primary-side switch has a bipolar transistor, a field-effect transistor, or an insulated gate bipolar transistor (IGBT).

20. A switched-mode power supply according to claim 19, wherein the primary-side switch has a bipolar transistor, a field-effect transistor, or an insulated gate bipolar transistor (IGBT).

* * * * *